United States Patent [19]
Blaha

[11] Patent Number: 5,469,504
[45] Date of Patent: Nov. 21, 1995

[54] AUTOMATIC CALL DISTRIBUTION WITH INTERSUBNETWORK CUSTOMER INFORMATION TRANSFER SYSTEM AND METHOD

[76] Inventor: David L. Blaha, 1650 Trafalgar La., Aurora, Ill. 60504

[21] Appl. No.: 337,572

[22] Filed: Nov. 10, 1994

Related U.S. Application Data

[63] Continuation of Ser. No. 960,995, Oct. 14, 1992, abandoned.

[51] Int. Cl.⁶ .................................................. H04M 3/58
[52] U.S. Cl. ........................... 379/265; 379/212; 379/96; 379/210
[58] Field of Search ........................... 379/94, 96, 265, 379/266, 210, 211, 212, 214, 201

[56] References Cited

U.S. PATENT DOCUMENTS 4,723,273  2/1988  Diesel et al. ............................ 379/211
5,008,930  4/1991  Gawrys et al. ......................... 379/212
5,181,239  1/1993  Jolissaint ................................ 379/265

Primary Examiner—Ahmad Matar

[57] ABSTRACT

An automatic call distributor (10) with a plurality of subnetwork switches (14A, 14B) for interconnecting agent units (18A, 18B) with customer telephonic units (15) of an external telephonic network (16) and a host data base computer for storing customer information obtained from agents (18A, 18B) of all the subnetworks (11A, 11B) with an intersubnetwork transfer system for transferring customer information stored in the host data base computer and obtained from an agent (18A, 18B) of one of the networks (11A, 11B) to a display terminal (22B, 22A) of an agent (18B, 18A) of another one of the subnetworks (11B, 11A) by the method (FIG. 4) of conveying call identification information (FIG. 3) including both subnetwork switch port identification and subnetwork trunk identification to the host data base computer (12) for association with the stored customer information and to the other subnetwork (11B, 11A) during an intersubnetwork transfer.

19 Claims, 3 Drawing Sheets

| BYTE | MS     BITS     LS | | | | | | | | DESCRIPTION | |
| --- | --- | --- | --- | --- | --- | --- | --- | --- | --- | --- |
| | 7 | 6 | 5 | 4 | 3 | 2 | 1 | 0 | | |
| 0 | colspan: 150 (H'96) | | | | | | | | RECORD TYPE | |
| 1 | D3 | | | | D4 | | | | POSITION'S | 36 |
| 2 | D1 | | | | D2 | | | | IDENTIFICATION | |
| 3 | AGENT PORT ID (LSB) | | | | | | | | AGENT | 38 |
| 4 | AGENT PORT ID (MSB) | | | | | | | | PORT | |
| 5 | TRUNK PORT ID (LSB) | | | | | | | | TRUNK | 34 |
| 6 | TRUNK PORT ID (MSB) | | | | | | | | PORT | |
| 7 | ORIGINATING TRUNK PORT-ID (LSB) | | | | | | | | CALL ORIGINATION IDENTIFICATION INFROMATION | 40 |
| 8 | ORIGINATING TRUNK PORT-ID (MSB) | | | | | | | | | |
| 9 | ORIGINATING SWITCH NODE ID | | | | | | | | | |

AUTOMATIC CALL DISTRIBUTION WITH INTERSUBNETWORK CUSTOMER INFORMATION TRANSFER SYSTEM AND METHOD

This application is a continuation of application Ser. No. 07/960,995, filed Oct. 14, 1992 (now abandoned).

BACKGROUND OF THE INVENTION

1. Field of the Invention

This invention relates generally to an automatic telephone call distribution network, or automatic call distributor and, more particularly, to an automatic call distributor with a plurality of subnetwork switches respectively connected with different internal subnetwork groups of telephonic agent units with associated display terminals for displaying customer information stored in a single host computer.

2. Description of the Related Art Including Information Disclosed Under 37 C.F.R. §1.97–1.99

Automatic call distributors employing subnetwork switches for selectively interconnecting customer calls from units of an external telephonic network with a plurality of agent units of internal subnetworks of the call distributor are well known. Examples of such call distributor systems are shown in patent application U.S. Pat. No. 5,268,903 of Jones et al. entitled "Multichannel Telephonic Switching Network With Different Signaling Formats and Connect/PBX Treatment Selectable For Each Channel", issued Dec. 7, 1993; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992 and U.S. Pat. No 5,127,004 of Lenihan et al. entitled "Tone and Announcement Message Code Generator for a Telephonic Switching System and Method", issued Jun. 30, 1992. It is also known in such automatic call distributors having more than one subnetwork switch to utilize a common, remote, host database computer for data communication between the subnetwork switches of the distributor. Disadvantageously, however, in such known automatic call distributors the host computer is not able to determine the origination of a telephone call that is transferred from an agent of one subnetwork switch to an agent of another subnetwork switch. Consequently, it is not possible in such distributor to make intersubnetwork transfers of customer information when calls are transferred between subnetworks.

Instead, in known automatic call distributors, each time there is a transfer to an agent in another subnetwork other than the one which originally received the call, the stored customer information cannot be accessed by the new agent and the new agent must therefore duplicate the information gathering process. In such a system, a customer call from an external, customer telephonic unit is received on a trunk of a subnetwork switch, and the call is transferred by the subnetwork switch to an agent at an agent telephonic unit of the associated subnetwork. Information gathered by the agent about the customer is typed into a temporary memory at the display terminal associated with the agent unit for viewing on a CRT or other display and then transferred to and stored in the host data base computer.

If the agent cannot adequately service the customer call, the agent will transfer the call to another agent to assist the customer. If the call is transferred to an agent unit of a subnetwork different than that of the transferring agent, when the call is connected to the other agent, the host computer determines the port at which the other agent is connected. There is not, however, any storage in the data base of the host computer of the identity of the trunk line or the subnetwork switch to which the originally received customer call was connected and, thus, the identity of which agent originally serviced the call. Consequently, the host computer cannot transfer the originally gathered customer information stored in its common data base for display at the CRT terminal of the new agent servicing the call at the other subnetwork.

Thus, adequately servicing the customer requires the new agent in the other subnetwork to again ask the customer many of the same information gathering questions (i.e. customer name, address, account number, etc.) as previously asked by the agent who originally received the call. This disadvantageously results in a much longer time to fully service a customer call and annoyance of the customer for being required to repeatedly answer the same information gathering questions over again.

SUMMARY OF THE INVENTION

Accordingly, it is the principal object of the present invention to provide an automatic call distributor with an intersubnetworking customer information transfer system and methods pursuant to which the inability of known call distributors to transfer customer information between subnetworks is overcome. Preferably, this is achieved by conveying to the host computer call origination identification information identifying the original port and subnetwork of an originally received customer call.

The object is achieved in part by providing an automatic call distributor with a plurality of interconnecting subnetworks, each with a subnetwork switch and an associated group of telephonic agent units for receiving customer calls from customer telephonic units of an external telephonic network, and a host data base computer for storing customer information received from groups of display terminals respectively associated with the telephonic agent units, with an intersubnetwork customer information transfer system having means for transferring a customer call from one agent unit to another agent unit and means responsive to said transferring means transferring a customer call from one agent unit of one of the plurality of subnetworks to another agent unit of another one of the plurality of agent units for conveying information concerning the customer and stored in the host data base computer to the display terminal associated with the other agent unit of the other subnetwork to which the customer call is transferred for display.

In a preferred embodiment this is achieved by providing such an automatic call distributor with means for providing a call origination identification code indicating the identity of the agent units including the identity of the associated subnetworks of the agent units and means for transmitting the call origination identification code from one subnetwork originally receiving a customer call to another subnetwork with the other agent unit to which the customer call is transferred. Means at a subnetwork switch receiving a transferred call provides to the host data base computer the call origination identification of one agent transferring the call to enable conveyance of stored customer information to a display terminal of the other agent unit to which the call is being transferred.

The objective is also achieved in part by providing such an automatic call distributor with a method of transferring stored customer information between display terminals of different subnetworks comprising the steps of (1) transferring a customer call from one agent to another, (2) sensing whether the transferring of the customer call is between agents of different subnetworks and (3) conveying customer information in response to the sensing means from the host data base computer to the display terminal associated with the other agent for display thereof when the call is transferred to the other agent unit.

Moreover, the object of the present invention is achieved by providing an automatic call distributor network having a host computer for controlling a plurality of subnetwork switches for selectively interconnecting customer calls from units of an external telephonic network with a plurality of agent units of a plurality of internal subnetworks respectively associated with the plurality of subnetwork switches, with an intersubnetwork customer information transfer method, comprising the steps of (1) establishing a call origination identification code identifying an agent unit and internal subnetwork switch in response to the agent unit receiving an original call from the external network, (2) conveying the call origination identification code to the host computer, (3) transferring the call origination identification code with an original customer call when the original customer call is transferred from one internal subnetwork to another internal subnetwork and (4) using the call origination identification at the other subnetwork to display the customer information at another agent unit of the other subnetwork to which the original call is transferred.

Preferably, this method includes the additional steps of (5) gathering customer information at a display terminal associated with the one agent unit, (6) sending the customer information from the display terminal of the one agent unit to the host computer and (7) storing the gathered customer information in the host computer in association with the identity of the one agent unit.

BRIEF DESCRIPTION OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
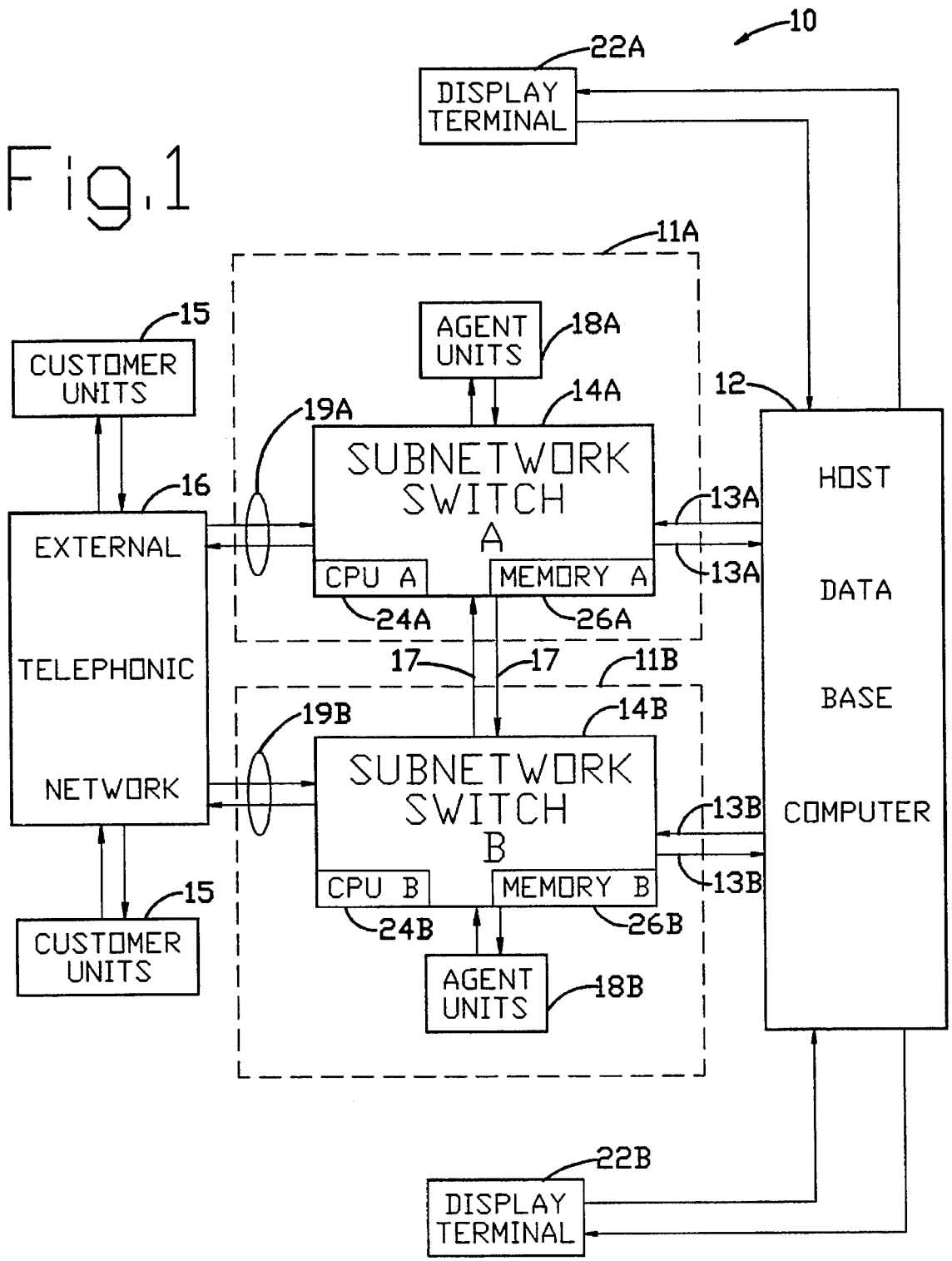
FIG. 1 is a functional block diagram of the preferred embodiment of the automatic call distribution network of the present invention as interconnected with a known external telephonic network of customer units.

Referring to FIG. 1, an automatic call distributor network 10 of the preferred embodiment is shown having a host data base computer 12 for communicating with a plurality of subnetwork switches 14A and 14B. The switches 14A and 14B selectively interconnect customer calls from customer units 15 of an external telephonic network 16 with a plurality of agent units 18A and 18B respectively associated with and forming a part of a plurality of internal subnetworks 11A and 11B. The switches 14A and 14B of the present invention are respectively controlled by central processing units, or CPUs, 24A and 24B in conjunction with main memories, memory 26A and memory 26B. The central processing units 24A and 24B of the preferred embodiment are either DEC PDP models 11/34, 11/44, 11/84 or 11/94 manufactured by the Digital Equipment Corporation. Subnetworks 11A and 11B are respectively defined by internal subnetwork switches 14A and 14B connected with agent units 18A and 18B, respectively. The data base host computer 12 of the preferred embodiment is preferably a CLX model manufactured by the Tandem Computer Corporation. The subnetwork switches 14A and 14B are preferably Rockwell Galaxy models made by Rockwell International Corporation. Each switch has over three thousand switch voice path ports for connection to agent units 18A and 18B, interphase hardware, supervisor units and other telephonic units, not shown.

Generally, while the call origination identification system of the automatic call distribution network of the present invention can be implemented in numerous types and sizes of call distribution networks, it is preferably employed in a call distribution system of the type shown in patent application U.S. Pat. Ser. No. 5,268,903 of Jones et al. entitled "Multichannel Telephonic Switching Network With Different Signaling Formats and Connect/PBX Treatment Selectable For Each Channel", issued Dec. 7, 1993; U.S. Pat. No. 5,140,611 of Jones et al. entitled "Pulse Modulated Self-Clocking and Self-Synchronizing Data Transmission and Method for a Telephonic Communication Switching System", issued Aug. 18, 1992 and U.S. Pat. No. 5,127,004 of Lenihan et al. entitled "Tone and Announcement Message Code Generator for a Telephonic Switching System and Method", issued Jun. 30, 1992.

During operation of the automatic call distribution system network 10 of FIG. 1, a customer call dialed from a customer unit 15 of the external telephonic network 16 is received on a trunk port 19A of internal subnetwork switch 14A or on a trunk port 19B of the subnetwork switch 14B in the automatic call distribution network 10. Presuming the call is received on trunk port 19A, subnetwork switch 14A directs the call to a selected one of the plurality of agent units 18A in order for an agent stationed at the selected agent unit 18A to service the customer call. An identification code is provided for both the internal subnetwork switch 14A and the port of the subnetwork switch 14A to which the selected agent unit 18A is connected. Each voice path port of the switch 14A has an associated termination table in the memory 26A of the call distributor subnetwork 11A. These termination tables are memory records which contain information describing their corresponding port. The port termination table identification codes describe the port as being connected to a trunk, to an agent unit, to a supervisor unit, to a tone sender, etc.

The status of the termination table changes in response to events happening at the port. When a customer call is connected via the subnetwork switch 14A to the selected one of the plurality of agent unit 18A, the termination table for the port connected to the selected agent unit 18A stores the port ID code number for the trunk which received the call on the switch. Additionally, the port identification code number for the agent unit 18A is stored in the trunk termination table located in the central processing unit 24A memory 26A of the switch 14A. This is achieved by means of the central processing unit 24A cross referencing the port termination tables of the agent unit 18A and the trunk on the switch 14A receiving the customer call in response to the call being distributed and connected to the selected agent unit 18A. The subnetwork memory 26A stores a switch parameter table (not shown) which contains the information describing the characteristics and capabilities of the switch 14A. An identification code or switch node ID is provided in the switch parameter table which identifies and distinguishes the subnetwork switch 14A from any other switch.

Figures 2, 3:
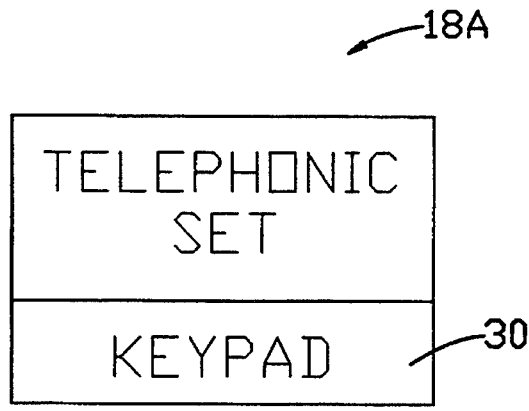
FIG. 2 is a functional block diagram of an agent unit of the automatic call distribution network of FIG. 1.
FIG. 3 is a table illustrating a Trunk-Agent Connect record of the preferred embodiment.

In response to the selected agent unit 18A being connected to the customer call, the switch 14A sends a call connection message record 32, FIG. 3, identifying the trunk port 34 (bytes five and six) connected to the agent unit 18A, the telephone number 36 (bytes one and two) of the agent unit and the agent unit port ID 38 (bytes three and four) to the host database computer 12, FIG. 1. The call connection message record or trunk-agent connect record 32 of FIG. 3 indicates to the host data base computer 12, FIG. 1, that the selected agent unit 18A is connected to an incoming trunk or to a system outdial call. The trunk-agent connect record 32 is a fixed length data packet located in the central processing unit memory 26A and 26B. The trunk-agent connect record 32 is sent to the host computer 12, FIG. 1, by an X.25 communication protocol across data communication lines 13A in response to the customer call being connected to the selected agent unit 18A. The call origination identification information 40 (bytes seven, eight and nine) appended to and inserted in the information call connection message record 32 is null to indicate to the host data base computer 12, FIG. 1, that this call originated on the subnetwork switch 14A and did not originate on any other switch. The host data base computer 12 is able to determine the switch node ID of the switch 14A receiving the call based on the set of communication lines 13A and 13B on which the call connection message was received.

The agent originally receiving the customer call at the selected agent unit 18A gathers information about the customer (i.e. customer name, address, credit card number, items for purchase, etc.) and inserts this information into a temporary memory of his associated display terminal or cathode ray tube (CRT) terminal 22A. Each agent unit 18A and 18B in the preferred embodiment has a corresponding display or CRT terminal 22A and 22B connected with the host computer 12. The inserted customer information is displayed at the display terminal 26A associated with the selected agent unit 18A. Preferably, the display terminal 22A is a personal computer or other display terminal with a CRT or the like, a key board and a memory buffer and logic for communication with the host data base computer. After this information taken from the customer, displayed on the CRT 22A and confirmed to be correct, it is sent to and stored in the host data base computer 12.

If the agent at the selected agent unit 18A determines that he can no longer service the customer call, the agent will transfer the call to another agent who is capable of servicing the customer call. The agent transfers the customer call by actuating an appropriate key of a keypad 30, FIG. 2, of his associated agent unit 18A.

In order to achieve the objective of the invention in the preferred embodiment, if the customer call is transferred to an agent at another, internal subnetwork 11B having an associated subnetwork switch 14B differing from that of the one internal subnetwork 11A at which the call originated, the call, along with call origination identification information 40, FIG. 3, is sent to the other internal subnetwork switch 14B. This call origination identification information is carried to the other switch 14B via an intertandem protocol over the intertandem trunks 17, FIG. 1, interconnecting the subnetwork switches 14A and 14B.

The intertandem protocol is sent over the intertandem trunks 17 as dual tone multiple frequency digits, or DTMF, digits. The intertandem protocol used between the subnetwork switches 14A and 14B in the preferred embodiment is an 0NNET CALL T-C-H-SS-PPP-0-NNX-XXXX in which: T=type, C=class of service, H=hop count, SS=originating node switch ID, PPP-port-ID on originating node, NNX-XXXX=the telephone number of the gate to which the call is being transferred at the other switch 14B.

The call origination identification information 40, FIG. 3, which is transferred from the subnetwork switch 14A to the other subnetwork switch 14B includes the incoming trunk port ID (i.e. PPP of the intertandem protocol) and the switch node ID (i.e. SS of the intertandem protocol) for the original customer telephonic call. The call origination identification information is inserted into the intertandem protocol and sent from the selected subnetwork 11A to the other subnetwork 11B.

The customer call and the intertandem protocol arrive on an intertandem trunk port of the other subnetwork switch 14B. In response to the call arriving at the other subnetwork switch 14B, the call origination identification information 40, FIG. 3 (i.e. the switch node ID and the port-ID on the originating switch 14A) is extracted from the intertandem protocol and saved in the termination table for the incoming intertandem trunk port in the memory 26B of the other internal subnetwork switch 14B. When the transferred customer call is connected to the other agent unit 18B the call origination identification information in the port termination table of the intertandem trunk port for the other switch 14B is placed in bytes seven, eight and nine of the trunk-agent connect record of FIG. 3. The port termination table for the intertandem trunk of subnetwork switch 14B and the termination table for the port of the other agent unit 18B exchange information to update the status of each port in response to the transferred call being connected to the next agent unit 18B.

The customer call is then connected to the other agent unit 18B in the subnetwork of the other subnetwork switch 14B. In response to the call being connected to the other agent unit 18B of the other subnetwork 11B, the other switch 14B sends the trunk-agent connect record 32 of FIG. 3 containing the trunk port ID (bytes five and six), the agent unit port ID (bytes three and four) and the telephone number (bytes one and two) of the agent unit 18B to which the call is connected, to the host data base computer 12.

This information in the call connection message 32 is sent to the host computer 12, FIG. 1, via an X.25 communication protocol across data communication lines 13B between the host data base computer 12 and the second switch 14B. Additionally, the other internal subnetwork switch 14B also conveys the call origination identification information 40, FIG. 3, in bytes seven, eight and nine in the trunk agent connect record 32, to the host data base computer 12, FIG. 1, to identify the original trunk port 40A and the original switch node 40B of the original subnetwork 11A receiving the customer call. Since the host computer 12 is aware of the switch or node 14B and the agent unit 18B to which the customer call is now connected, in addition to the switch 14A and selected agent unit 18A to which the customer call was originally connected, the host data base computer retrieves the customer information which it received and stored from the associated display terminal 22A of the selected agent unit 18A.

The host computer 12 is programmed to send the previously collected customer information from the display terminal 22A associated with the selected agent unit 18A to the other terminal 22B when the host 12 receives the trunk-agent connect record 32, FIG. 3, having call origination identification information 40 in bytes seven, eight and nine. This information is automatically displayed on the CRT 22B associated with the other agent unit 18B. The host data base computer 12 receives information indicating to which agent unit 18B the call is presently connected and to which agent unit 18A the call was originally connected through the trunk-agent connect record 32, FIG. 3. The host data base computer 12, FIG. 1, looks for the call origination identification information 40, FIG. 3, and sends the previously collected customer information for display on the display terminal 22B of the agent unit 18B which is connected to the customer call.

The host computer 12 stores the retrieved customer information which the original agent gathered and sends this information for display at another CRT terminal 22B associated with the other agent unit 18B. The agent at the other agent unit 18B which is connected to the customer call, now has available to him at his CRT 22B the information recorded by the original agent at the selected agent unit 18A. Therefore, the transferred agent at the next agent unit 18B does not have to ask all the same information gathering questions which the original agent asked of the customer. This provides for quicker and more efficient servicing of customer calls and eliminates possible annoyance to the customer from being required to answer the same questions over again each time they are transferred to an agent at another subnetwork.

While the advantages of the invention are preferably obtained with the automatic call distributor network 10 described above with reference to FIG. 1, the method of the invention can be practiced with other automated call distribution networks having a plurality of subnetwork switches for selectively interconnecting customer calls from customer units of an external telephonic network with a plurality of telephonic agent units of a plurality of internal subnetworks respectively associated with the subnetwork switches of the call distribution network. In any event, the steps of the preferred method of practicing the invention comprise the steps of (1) establishing a call origination identification code identifying the originating trunk port and internal subnetwork switch in response to the agent unit receiving an original call from the external telephonic network, (2) conveying the call origination identification code to a host data base computer, (3) transferring the call origination identification code with an original customer call when the original customer call is transferred from one internal subnetwork to another internal subnetwork and (4) using the call origination identification at the other subnetwork to display the customer information at another agent unit of the other subnetwork to which the original call is transferred.

Figure 4:
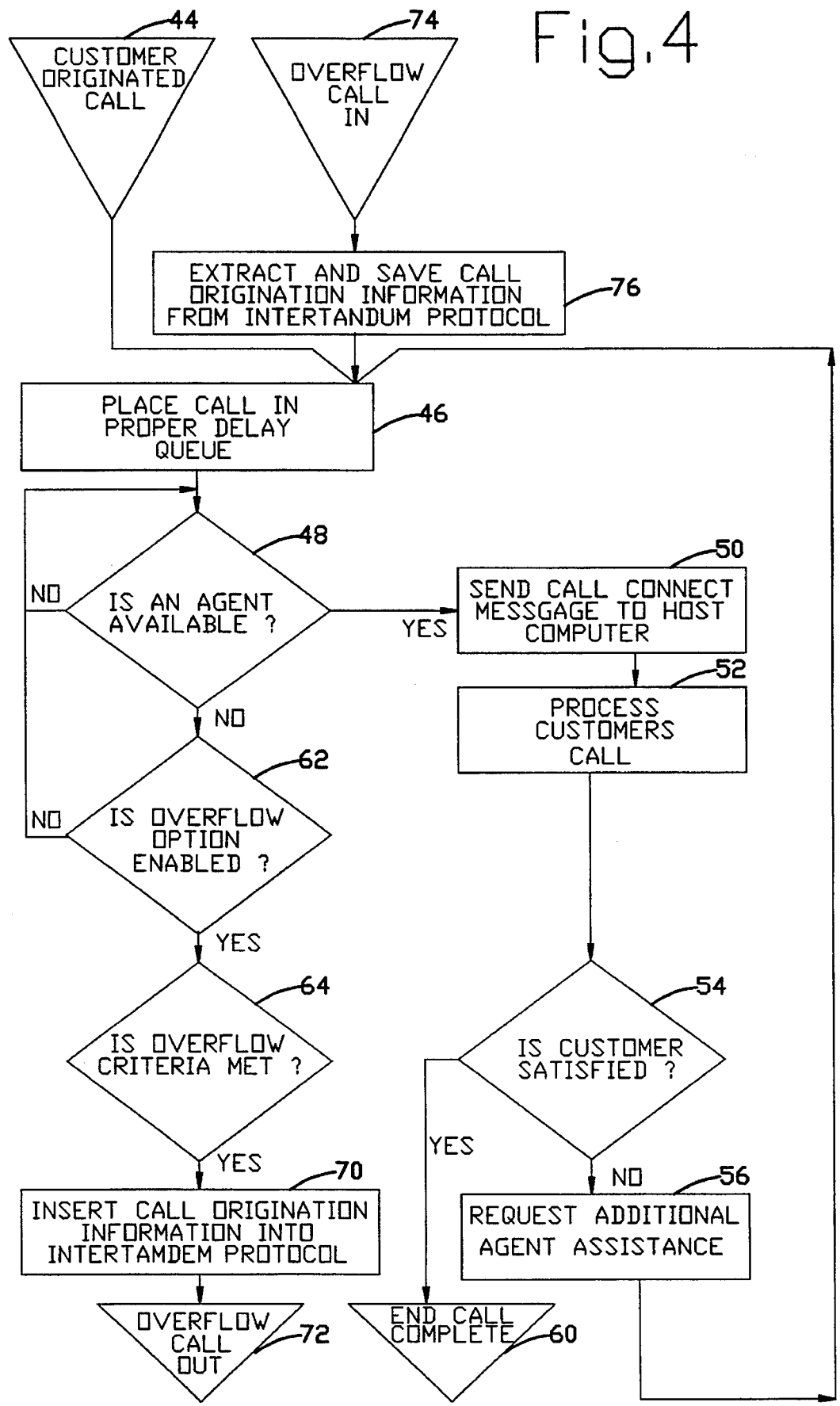
FIG. 4 is a flow chart of the steps for processing a customer call between different subnetwork switches of the preferred embodiment of FIG. 1.

Referring to FIG. 4, this method is preferably performed in the automatic call distributor network, FIG. 1, by a customer making and originating a call by dialing out on a customer unit 15 through the external telephonic network 16, as seen in step 44. After the call is received on a switch 14A, FIG. 1, of the call distributor network 10, the customer call is placed in a proper delay queue as seen in step 46, FIG. 4. A call origination identification code is established to identify the trunk port for the selected agent unit 18A and the subnetwork switch ID upon the agent unit 18A being connected to the original customer call. In the preferred embodiment there is a different queue for different types of agents (i.e. sales agents, service agents, billing agents, etc.)

In step 48, central processing unit 24A controlling the receiving switch 14A determines if an agent is available to service the customer call. If an agent is available, then in step 50 the call is connected to a selected agent unit 18A and the central processing unit 24A directs the switch 14A, FIG. 1, to send the trunk-agent connect record 32, FIG. 3, from the memory 26A, FIG. 1, to the host computer 12. The call connection information is contained in the trunk-agent connect record 32, FIG. 3. The trunk-agent connect record 32, which includes the call origination identification code 40, is sent from the internal subnetwork 11A, FIG. 1, to the host computer 12 via an X.25 communication protocol across data communication line 13A.

The call connection information sent to the host computer 12 includes the trunk port ID receiving the customer call 34 (bytes five and six), the port ID 38 of the agent unit 18A connected to the call (bytes three and four) and the telephone number 36 of the selected agent until 18A (bytes one and two). The call origination identification code 40 in bytes seven, eight and nine is null to indicate that the customer call on the switch 14A, FIG. 1, is an originally received call and is not an outdial call received from another subnetwork.

In step 52, FIG. 4, the agent services the customer call by answering the customer questions and gathering customer information such as the customer name, address, items for purchase or service, credit card number, etc. This gathered information is displayed on a CRT 22A, FIG. 1, associated with the agent unit 18A and is transferred to and stored in the host computer 12. In step 54, FIG. 4, the agent determines if the customer call is completely serviced and if the customer is satisfied. If the customer is satisfied, in step 60 the agent disconnects the call to the unit 18A and the processing of the call ends.

If the customer is not satisfied, or the agent is not capable of answering all the customer questions to fully service the call, the agent requests additional agent assistance to help service the call, as seen in step 56. The agent transfers the call to another agent in step 56 by pressing the keypad 30, FIG. 2, on the agent terminal of the selected unit 18A. The central processing unit 24A, FIG. 1, again places the customer call in the proper delay queue at a different gate on the switch 14A before the call is connected to another agent, as seen in step 46, FIG. 4. The call is sent to a different gate because a different classification of agent, located at units connected to another gate, is now requested to service the call. In step 48, again the central processing unit 24A, FIG. 1, of the switch 14A determines if another agent in the subnetwork 11A is available to service the call. If an agent is not available, the central processing unit 24A determines if an overflow option is enabled, as seen in step 62, FIG. 4. The overflow option looks to the system parameter table (not shown) to see if the switch 14A is allowed to transfer a call from one subnetwork 11A to another subnetwork 11B. If the overflow option is not enabled, the central processing unit 24A returns and continues to see if an agent on a gate at the same subnetwork switch 14A is available in step 48, FIG. 4.

If the overflow option is on, thus indicating that the switch 14A has the ability to overflow calls to another subnetwork switch 14B, then in step 64, FIG. 4, the central processing unit 24A determines if the overflow criteria is met. The overflow criteria is a set of standards which determine if the call remains on the same switch node 14A or if it is transferred to another switch node 14B. Typically, the overflow criteria is based on how long the call has been delayed at the gate. If the overflow criteria is not met, the system returns to step 48, FIG. 4, to see if an agent at the same switch node 14A is now available. Once the overflow criteria is met, the customer call is transferred to another switch node 14B. In step 70, FIG. 2, the call origination identification information is inserted into the intertandem protocol.

The central processing unit 24A obtains switch node ID for its associated switch from the switch parameter table, not shown. The central processing unit 24A obtains the trunk port ID on the originating switch 14A from the port termination table of the original trunk for the customer call which is overflowed to the next switch node 14B. The central processing unit 24A fills in the information in the appropriate digits of the intertandem protocol. Next, in step 72, FIG. 4, the call is overflowed or sent from the originally received switch 14A, FIG. 1, of one subnetwork 11A to another switch 14B of another subnetwork 11B. The intertandem protocol is sent from one internal subnetwork 11A with the customer call to the other internal subnetwork 11B via an intertandem trunk 17.

In step 74, FIG. 4, the overflow call is received on an intertandem trunk port of the next or other switch 14B, FIG. 1. Next, in step 76, FIG. 4, the central processing unit 24B for the other switch 14B, FIG. 1, extracts the call origination identification code from the intertandem protocol. This information is stored and saved in the port termination table for the intertandem trunk port in the memory 26B for the other internal subnetwork switch 14B.

Since the customer call is now received on the other switch 14B, FIG. 1, the call is placed in the proper delay queue for the other switch 14B, as seen in step 46, FIG. 4. Additionally, as seen in FIG. 4, the same method steps are taken to process the call as were taken when the call was connected on the original switch 14A.

When the transferred call is connected to the other agent unit 18B, the call origination identification code stored in the port termination table for the trunk of the other switch 14B is inserted into bytes seven, eight and nine of the trunk-agent connect record 32 of FIG. 3. The trunk-agent connect record 32 containing the call origination identification code 40 identifying the original trunk port 40A and the original switch ID 40B is sent via an X.25 communication protocol across line 13B to the host computer 12, FIG. 1. Information identifying the location of the customer call 34, 36 and 38, FIG. 3, at the second agent unit 18B, FIG. 1, is also included in the trunk-agent connect record 32 in bytes one through six.

The receipt of the call origination identification code 40, FIG. 3, triggers the host data base computer 12, FIG. 1, to send the originally gathered customer information from display at the original CRT 22A to the CRT 22B associated with the other agent unit 18B which is connected to the customer call. This customer information is sent from the host computer 12 to the other CRT 22B in response to the original customer call being transferred from the selected agent unit 18A to the other agent unit 18B of the other internal subnetwork 11B. Therefore, the agent at the other agent unit 18B has the information available to him which was previously collected by the agent who originally serviced the call. The agent at the other unit 18B does not have to repeat the same information gathering questions to the customer and thus, the servicing of the call is more efficient and more pleasant to the customer.

While a detailed description of the preferred embodiment of the invention has been given, it should be appreciated that many variations can be made thereto without departing from the scope of the invention as set forth in the appended claims. For instance, although for purposes of simplicity only two subnetworks have been illustrated, the invention operates in the same way in distributors with more subnetworks.

I claim:

1. In an automatic call distributor having a plurality of interconnecting subnetworks, each with an automatic call distributor subnetwork switch and an associated group of telephonic agent units for receiving customer calls from customer telephonic units of an external telephonic network, and a single host data base computer for storing customer information received from groups of display terminals respectively associated with the telephonic agent units of the plurality of different subnetworks, the improvement being an intersubnetwork customer information transfer system, comprising:

means, apart from the external telephonic network, for internally transferring a customer call from one agent unit of one of the plurality of subnetworks to another agent unit of another one of the plurality of subnetworks including information identifying the one agent unit via an internal intertandem trunk line connected between the automatic call distributor switch of the one subnetwork and the automatic call distributor switch of the other subnetwork; and means responsive to the identifying information of the one agent unit transferred by said internally transferring means between the switch of the one subnetwork and the switch of the other subnetwork for enabling the single host database computer to convey stored customer information obtained at the one agent unit and stored in the single host data base computer to the display terminal associated with the other agent unit of the other subnetwork to which the customer call is transferred for display.

2. The automatic call distributor of claim 1 in which said means for enabling the single host database computer to convey stored customer information includes means for providing a call origination identification code indicating the identity of the one agent unit including the identity of the associated subnetwork of the one agent unit, and means for transmitting the call origination identification code from one subnetwork of the one agent unit to the subnetwork of the other agent unit to which the customer call is transferred.

3. The automatic call distributor of claim 2 in which the means for enabling the single host database computer to convey stored customer information includes means for sending the call origination identification code to the single host data base computer in response to the call being originally received at the one agent unit, and means at the other subnetwork switch for providing to the single host data base computer the call origination identification code of the one agent transferring the code to enable conveyance of the stored customer information to the display terminal of the other agent unit to which the call is being transferred.

4. The automatic call distributor network of claim 2 in which each of the subnetwork switches has a plurality of ports to which the agent units are connected, and said identification code includes identification of both the one subnetwork and the other subnetwork and the port of the one subnetwork to which the one agent is connected.

5. The automatic call distributor of claim 2 in which said transmitting means includes means for conveying to the single host data base computer the call origination identification code of the one agent unit automatically in response to the call being originally received by the one agent unit; and said single host data base computer includes means responsive to receipt of the call origination identification code for associating the stored customer information with the one agent unit in the single host data base computer.

6. The automatic call distributor network of claim 2 in which said transmitting means includes means for inserting the call origination identification code into an intertandem protocol, and means for sending the intertandem protocol over the intertandem trunk interconnecting the one subnetwork with the other subnetwork from the one subnetwork to the other subnetwork.

7. The automatic call distributor of claim 6 in which each of the subnetworks has a subnetwork memory, and the stored customer information conveyance enabling means includes means for extracting the call origination identification code from the intertandem protocol, and means for saving the extracted call origination identification code in the subnetwork memory of the other internal subnetwork for conveyance to the single host data base computer.

8. The automatic all distributor of claim 1 in which the means for enabling the single host database computer to convey stored customer information includes means for sending to the single host database computer a call origination identification code via an X.25 communication protocol.

9. The automatic call distributor of claim 1 in which the one subnetwork has a memory with a call connection message record, and said means for enabling the single host database computer to convey stored customer information includes means for inserting a call origination identification code into the call connection message record in the memory of the one subnetwork.

10. In an automatic call distributor having a plurality of interconnecting subnetworks, each with an automatic call distributor subnetwork switch and an associated group of telephonic agent units for receiving customer calls from customer telephonic units of an external telephonic network, and a single host data base computer for storing customer information received from groups of display terminals respectively associated with the telephonic agent units of the plurality of different subnetworks, the improvement being a method of transferring stored customer information between display terminals of different subnetworks, comprising the steps of:

internally transferring, by means apart from the external telephonic network, a customer call from one agent to another;

sending information identifying the one agent unit via an internal intertandem trunk line connected between the automatic call distributor switch of one subnetwork and the automatic call distributor switch of another subnetwork when transferring the customer call between interconnecting subnetworks;

sensing whether the transferring of the customer call is between agents of different subnetworks; and conveying customer information from the single host data base computer in response to the sensing of the customer call being transferred between different subnetworks to the display terminal associated with the other agent for display thereof when the call is internally transferred to the other agent unit associated with the automatic call distributor switch of the other subnetwork.

11. The stored customer information transferring method of claim 10 including the steps of providing a call origination identification code indicating the identity of the agent units including the identity of the associated subnetworks of the agent units, and transmitting the call origination identification code from one subnetwork of the one agent unit to the subnetwork of the other agent unit to which the customer call is transferred.

12. The stored customer information transferring method of claim 11 including the steps of conveying the call origination identification code from the subnetwork of the other agent unit to the single host data base computer in response to the customer call being transferred to the other agent unit, and providing to the single host data base computer the call origination identification code of the one agent transferring the call to enable conveyance for the stored customer information to the display terminal of the other agent unit to which the call is being transferred.

13. In an automatic call distributor network having a plurality of internal subnetworks wherein each internal subnetwork has its own associated subnetwork switch with each subnetwork switch having an associated central processing unit for controlling the switching operations at the subnetwork switches including selectively interconnecting customer calls from customer units of an external telephonic network with a plurality of agent units of the plurality of internal subnetworks respectively associated with the plurality of subnetwork switches, and a single host data base computer coupled with the plurality of internal subnetworks in which the single host data base computer stores customer information received from groups of display terminals respectively associated with the agent units of the plurality of internal subnetworks, the improvement being an intersubnetwork customer information transfer method, comprising the steps of:

establishing a call origination information code at one internal subnetwork identifying the agent unit and internal subnetwork switch in response to the agent unit receiving an original call at the internal subnetwork switch of the one internal subnetwork from the external network;

conveying the call origination identification code from the one internal subnetwork to the single host data base computer upon the agent unit receiving the original call;

transferring the call origination identification code with the original call when the original call is transferred from the one internal subnetwork to another internal subnetwork; and using the call origination identification code at the other internal subnetwork to display the customer information at a terminal associated with another agent unit of the other subnetwork to which the original call is transferred.

14. The intersubnetwork customer information transfer method of claim 13 including the steps of inserting the call origination identification code into an intertandem protocol, and sending the intertandem protocol over an intertandem trunk interconnecting the one internal subnetwork with the other internal subnetwork from the one internal subnetwork to the other internal subnetwork.

15. The intersubnetwork customer information transfer method of claim 14 including the steps of extracting at the other internal subnetwork the call origination identification code from the intertandem protocol, saving the call origination identification code in a memory of the other internal subnetwork, and sending the call origination identification code extracted from the intertandem protocol from the other internal subnetwork to the single host computer.

16. The intersubnetwork customer information transfer method of claim 13 in which the step of conveying the call origination identification code includes the step of sending the call origination identification code from the internal subnetwork to the single host computer via an X.25 communication protocol.

17. The intersubnetwork customer information transfer method of claim 13 including the step of inserting the call origination identification code into a trunk-agent connect record in a memory of the internal subnetwork.

18. The intersubnetwork customer information transfer method of claim 13 including the steps of gathering customer information at a display terminal associated with the one agent unit, sending the customer information from the display terminal of the one agent unit to the single host computer, and storing the gathered customer information in the single host computer in association with the identity of the one agent unit.

19. The intersubnetwork customer information transfer method of claim 18 including the step of sending the customer information stored in the single host computer to a display terminal associated with the other agent unit in response to the original customer call being transferred from the one agent unit of the one internal subnetwork to the other agent unit of the other internal subnetwork.

* * * * *